United States Patent
Schenk et al.

(10) Patent No.: US 7,011,593 B2
(45) Date of Patent: Mar. 14, 2006

(54) TENSIONING OR DEFLECTION PULLEY FOR A BELT DRIVE

(75) Inventors: Rainer Schenk, Fürth (DE); Aleksandar Lutkic, Herzogenaurach (DE)

(73) Assignee: Ina-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/933,168

(22) Filed: Sep. 2, 2004

(65) Prior Publication Data

US 2005/0026729 A1  Feb. 3, 2005

Related U.S. Application Data

(63) Continuation of application No. PCT/EP03/01005, filed on Feb. 1, 2003.

(30) Foreign Application Priority Data

Mar. 5, 2002  (DE) ................................ 102 09 673

(51) Int. Cl.
 *F16C 33/78* (2006.01)
 *F16H 55/36* (2006.01)
 *F16H 7/12* (2006.01)

(52) U.S. Cl. ..................... 474/199; 474/135; 384/477; 384/486

(58) Field of Classification Search ............ 474/69–70, 474/74, 199, 135; 384/386, 480, 482, 284, 384/477, 486, 543; 192/41 S, 81, 84.8
See application file for complete search history.

(56) References Cited

U.S. PATENT DOCUMENTS

| | | | | |
|---|---|---|---|---|
| 3,537,725 A | * | 11/1970 | Frost | 384/480 |
| 3,770,992 A | | 11/1973 | Veglia | |
| 4,113,328 A | * | 9/1978 | Vander Meulen | 384/486 |
| 4,433,963 A | * | 2/1984 | Shimano | 474/94 |
| 4,602,875 A | * | 7/1986 | Doerr et al. | 384/543 |
| 5,449,328 A | * | 9/1995 | Schmidt et al. | 474/135 |
| 6,083,130 A | * | 7/2000 | Mevissen et al. | 474/70 |
| 6,394,247 B1 | * | 5/2002 | Monahan et al. | 192/41 S |
| 6,854,893 B1 | * | 2/2005 | Schmidt | 384/477 |

FOREIGN PATENT DOCUMENTS

| | | |
|---|---|---|
| DE | 24 10 381 A | 9/1975 |
| DE | 32 40 075 A1 | 5/1984 |
| DE | 37 19 479 A1 | 12/1988 |
| DE | 41 34 354 A | 4/1993 |
| DE | 93 07 931 U | 7/1993 |
| DE | 43 43 429 C2 | 6/1995 |
| DE | 695 18 596 T2 | 5/2001 |
| DE | 100 13 978 A1 | 10/2001 |
| DE | 100 24 318 A | 11/2001 |
| WO | WO 01/71216 A | 9/2001 |

* cited by examiner

*Primary Examiner*—Marcus Charles
(74) *Attorney, Agent, or Firm*—Henry M. Feiereisen

(57) ABSTRACT

A tensioning or deflection pulley for a belt drive includes a carrier and a track roller comprised of an inner ring, an outer ring, and a connecting assembly, including a wheel disk extending between the inner and outer rings, and a rib assembly disposed in both sides of the disk in circumferential spaced-apart relationship, for interconnecting the inner and outer rings. The track roller is supported on the carrier by a sealed rolling-contact bearing via a fastening screw. A first sealing element is connected to the track roller on a carrier-distal side, and a second cap-shaped sealing element is disposed between the carrier and the track roller and detachably secured to the inner ring of the track roller to thereby seal the track roller on both sides.

20 Claims, 1 Drawing Sheet

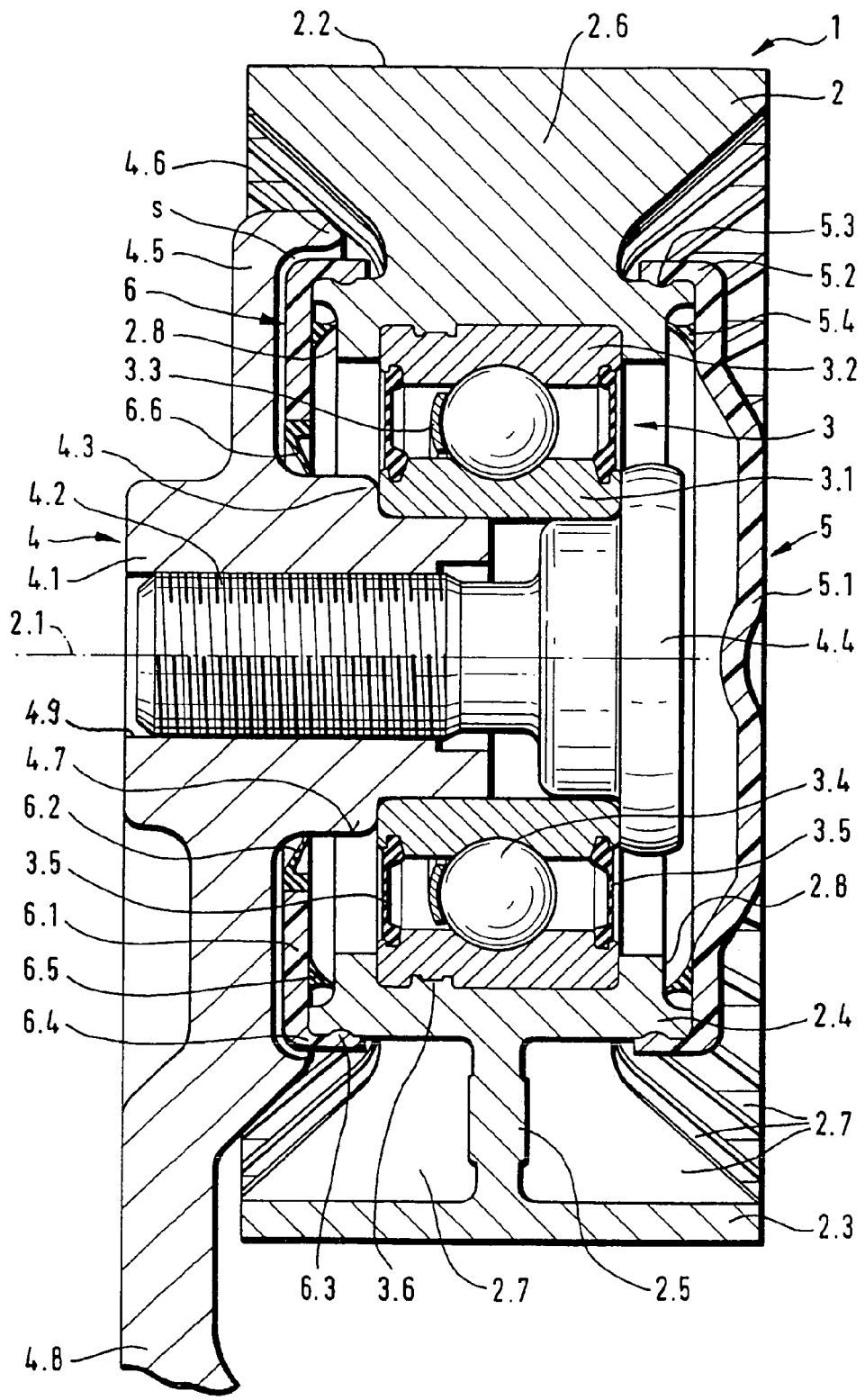

TENSIONING OR DEFLECTION PULLEY FOR A BELT DRIVE

CROSS-REFERENCES TO RELATED APPLICATIONS

This application is a continuation of prior filed copending PCT International application no. PCT/EP03/01005, filed Feb. 1, 2003, which designated the United States and on which priority is claimed under 35 U.S.C. §120, the disclosure of which is hereby incorporated by reference, and which claims the priority of German Patent Application, Serial No. 102 09 673.2, filed Mar. 5, 2002, pursuant to 35 U.S.C. 119(a)-(d).

BACKGROUND OF THE INVENTION

The present invention relates, in general, to a tensioning or deflection pulley for a belt drive.

Nothing in the following discussion of the state of the art is to be construed as an admission of prior art.

German patent publication DE 32 40 075 A1 describes a tensioning or defection pulley having a wheel disk which is rotatably mounted via a sealed rolling-contact bearing to a carrier. The wheel disk has a double-T-shaped cross section with an inner ring and an outer ring, which are interconnected by a center bridge formed with recesses that are separated from one another by ribs. The pulley is provided on its carrier-distal side with a cap cover which snaps onto the inner ring of the wheel disk. This conventional pulley suffers shortcomings arising from ingress of dirt because the sliding seals that are integrated in the rolling-contact bearing are unable to fully protect the interior. Dirt can thus migrate into the bearing region of the pulley and thereby significantly reduce the operating life of the pulley.

German patent publication DE 37 19 479 A1 describes a combined driving and tensioning pulley which is closed on one side by a snap-on lid and is provided on the other side with a lip seal in sliding contact upon a surface of a machine part. This type of pulley is also endowed with drawbacks and shortcomings relating to the need to conform the lip seal to the pertaining attachment structure, or for example to the effect that is hoped to be obtained but may not always be realized.

It would therefore be desirable and advantageous to provide an improved tensioning or deflection pulley to obviate prior art shortcomings and to provide superior protection of the bearing space.

SUMMARY OF THE INVENTION

According to one aspect of the present invention, a tensioning or deflection pulley for a belt drive includes a carrier, a track roller having an inner ring, an outer ring, and a connecting assembly, including a wheel disk extending between the inner and outer rings and a rib assembly disposed on both sides of the disk in circumferential spaced-apart relationship, for interconnecting the inner and outer rings, a sealed rolling-contact bearing for supporting the track roller on the carrier via a fastening screw, a first sealing element connected to the track roller on a carrier-distal side, and a second cap-shaped sealing element disposed between the carrier and the track roller and detachably secured to the inner ring of the track roller, with the second sealing element having an inwardly turned rim portion, which is formed with a locking element for attachment to the inner ring of the track roller, and a bottom portion formed with a central receiving bore for encompassing the carrier.

The present invention resolves prior art problems by providing the second sealing element in the form of a cap cover between the carrier and the track roller so that the bearing assembly of the track roller is effectively protected on all sides against ingress of dirt, spray water, coarse (hard) particles or the like. A pulley in accordance with the present invention can be easily installed in off-road vehicles which may be exposed to soil and water when crossing rivers, for example. Cap-shaped sealing elements are easy to make and easy to connect to an attachment structure (track roller).

According to another feature of the present invention, a first seal may be provided to extend axially inwards from the bottom portion of the second sealing element at a distance to the rim portion, and a second elastic seal may be provided to extend radially inwards in the area of the receiving bore, whereby the second seal has sealing lips which rest against an adaptation surface of the inner ring, on one hand, and an adaptation surface of the carrier, on the other hand. The second seal may hereby be molded onto the bottom portion of the second sealing element.

According to another feature of the present invention, the first sealing element may also be configured in the form of a cap cover having an axially inwardly directed rim portion formed with a locking element for securement to the inner ring, and a bottom portion, and an elastic seal may be provided to extend axially inwardly from the bottom portion of the first sealing element at a marginal area thereof, with the seal having a sealing lip resting against an adaptation surface of the inner ring. Thus, the first sealing element exhibits the same advantages as the second sealing element. In other words, the first sealing element is easy to produce and effectively protects the bearing for the pulley on the carrier-distal side.

According to another feature of the present invention, the carrier may be configured to have a hub and a carrier portion which extends radially outwardly from the hub and ends in an axially inwardly directed flange. Suitably, the carrier is spaced at a slight distance to the second sealing element to define a gap therebetween. More specifically, the gap may be defined between the radially outwardly directed portion of the carrier and the bottom portion of the second sealing element, and between the axially inwardly directed flange of the carrier and the rim portion of the second sealing element. The thus-formed gap acts as additional labyrinth seal to thereby improve the sealing action of the cap cover.

According to another feature of the present invention, the rib assembly may have an axial extension which decreases in a direction of the inner ring. In this way, the weight and mass of the pulley is slightly reduced while still exhibiting sufficient stability as a consequence of the arrangement of the rib assembly.

According to another feature of the present invention, the rolling-contact bearing may include an inner bearing race having an inner surface area received by the carrier and the fastening screw. As a result, assembly of the various components to make the pulley can be carried out in a simple manner. Suitably, the rolling-contact bearing may have an outer bearing race with an outer surface area formed with a recess to allow entry of injection-molded or pourable material of the pulley to establish a firm connection between the track roller and the inner bearing ring.

According to another feature of the present invention, the rolling-contact bearing may be configured in the form of a cage-guided grooved ball bearing.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a longitudinal section of a tensioning or deflection pulley according to the present invention.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a longitudinal section of a tensioning or deflection pulley according to the present invention, generally designated by reference numeral 1. The pulley 1 defines an axis 2.1 and includes a track roller 2 and a rolling-contact bearing 3 for supporting the track roller 2 on a carrier 4 for rotation about the axis 2.1. The track roller 2 has an outer surface area 2.2 in contact with a belt (not shown) and has a double-T-shaped configuration with an outer ring 2.3 and an inner ring 2.4, which are connected to one another by a wheel disk 2.5. Provided on both sides of the disk 2.5 are ribs 2.6 disposed in circumferential spaced-apart relationship and separated from one another by free spaces 2.7. The inner ring 2.4 has an axial extension which is smaller than the axial extension of the outer ring 2.3 so that the axial dimension of the ribs 2.6 decreases in the direction of the rolling-contact bearing 3.

The rolling-contact bearing 3 is configured as grooved ball bearing and includes an inner bearing race 3.1 and an outer bearing race 3.2 which define respective raceways for rolling elements 3.4 that are guided by a cage 3.3. The bearing 3 is sealed on both sides by sealing elements 3.5. The outer bearing race 3.2 has an outer surface area formed with a recess 3.6 to thereby allow establishment of a firm connection between the outer bearing race 3.2 and the roller 2.

The carrier 4 includes a hub 4.1 having an internally threaded receiving bore 4.9 for engagement of an outwardly threaded fastening screw 4.2. The inner bearing race 3.1 of the rolling-contact bearing 3 is securely fixed in place between a shoulder 4.3 of the hub 4.1 and a head portion 4.4 of the fastening screw 4.2. The hub 4.1 is formed with a radially outwardly directed carrier portion 4.5 which ends in an axially inwardly directed flange 4.6. The flange 4.6 extends hereby in a free space (not designated) anteriorly of the ribs 2.6.

The track roller 2 is protected on one side (the right side in FIG. 1) by a first sealing element in the form of cap cover 5 having a bottom portion 5.1 and a circumferential rim portion 5.2 which is directed inwardly. The rim portion 5.2 is provided with locking elements 5.3 for engagement in depressions of the inner ring 2.4. Molded to the inside of the bottom portion 5.1 in the marginal area thereof at a distance to the rim portion 5.2 is a seal 5.4 which has a sealing lip for abutment against an adaptation surface 2.8 of the inner ring 2.4 of the track roller 2. The cap cover 5 conjointly rotates with the track roller 2. In other words, the seal 5.4 is static as a consequence of the absence of any sliding movement between the sealing lip of the seal 5.4 and the adaptation surface 2.8 of the track roller 2.

The other, left side of the track roller 2 is protected by a second sealing element in the form of cap cover 6 having a bottom portion 6.1 which is provided with a central receiving bore 6.2 for receiving the hub 4.1 of the carrier 4. Analog to the cap cover 5, the cap cover 6 has a circumferential rim portion 6.4 formed with locking elements 6.3 for engagement in complementary depressions of the inner ring 2.4. The bottom portion 6.1 of the cap cover 6 has molded thereto on the inside in the direction of the rolling-contact bearing 3 a first seal 6.5 which is formed with a sealing lip for abutment against the adaptation surface 2.8 of the inner ring 2.4 of the track roller 2. Disposed in the central receiving bore 6.2 is a second seal 6.6 which is molded onto the confronting surface of the bottom portion 6.1 of the cap cover 6 and has a sealing lip resting against an adaptation surface 4.7 of the carrier 4.

As shown in FIG. 1, the seal 6.5 is static as no relative movement is intended between the sealing lip and the adaptation surface 2.8 of the track roller 2, whereas the sealing lip of the seal 6.6 is in sliding contact with the adaptation surface 4.7 of the hub 4.1. In other words, the seal 6.6 is dynamic. To prevent ingress of particles to the sliding seal 6.6, the cap cover 6 and the carrier 4 are so positioned in relation to one another as to define a slight gap s therebetween. The gap s, defined between the axial flange 4.6 and the rim portion 6.4 as well as between the radial carrier portion 4.5 of carrier 4 and the bottom portion 6.1 of the cap cover 6, thus forms an additional labyrinth seal.

The pulley 1 according to the present invention can be assembled in a very easy manner by first snapping the cap cover 6 to the inner ring 2.4 of the track roller 2 which forms with the rolling-contact bearing 3 a structural unit. The unitary structure now comprised of track roller 2, rolling-contact bearing 3 and cap cover 6 is pushed over the hub 4.1 against the shoulder 4.3 and secured in place in relation to the hub 4.1 on the carrier 4 through threaded engagement of the fastening screw 4.2. Subsequently, the cap cover 5 is snapped on to complete the assembly and sealing of the pulley 1. The pulley 1 can be shipped by the supplier as unitary structure to the customer who is only required to mount the pulley 1 via lever 4.8 of the carrier 4 to the desired attachment structure.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A tensioning or deflection pulley for a belt drive, comprising:
  a carrier;
  a track roller including an inner ring, an outer ring, and a connecting assembly for interconnecting the inner and outer rings, said connecting assembly including a wheel disk extending between the inner and outer rings and a rib assembly disposed on both sides of the disk in circumferential spaced-apart relationship;

a sealed rolling-contact bearing for supporting the track roller on the carrier via a fastening screw;

a first sealing element connected to the track roller on a carrier-distal side;

a second sealing element in the form of a cap cover disposed between the carrier and the track roller and detachably secured to the inner ring of the track roller, said second sealing element having an inwardly turned rim portion, which is formed with a locking element for attachment to the inner ring of the track roller, and a bottom portion formed with a central receiving bore for encompassing the carrier; and a first seal extending axially inwards from the bottom portion of the second sealing element at a distance to the rim portion, and a second seal extending radially inwards in the area of the receiving bore and made of elastic material, said second seal having sealing lips resting against an adaptation surface of the inner ring and an adaptation surface of the carrier.

2. The pulley of claim 1, wherein the second seal is molded onto the bottom portion of the second sealing element.

3. The pulley of claim 1, wherein the rib assembly has an axial extension which decreases in a direction of the inner ring.

4. The pulley of claim 1, wherein the rolling-contact bearing includes an inner bearing race having an inner surface area received by the carrier and the fastening screw.

5. The pulley of claim 1, wherein the rolling-contact bearing includes an inner bearing race held in place between a shoulder of the carrier and a head portion of the fastening screw.

6. The pulley of claim 1, wherein the rolling-contact bearing includes an outer bearing race having an outer surface area formed with a recess.

7. The pulley of claim 1, wherein the rolling-contact bearing is configured in the form of a cage-guided grooved ball bearing.

8. A tensioning or deflection pulley for a belt drive, comprising:

a carrier;

a track roller including an inner ring, an outer ring, and a connecting assembly for interconnecting the inner and outer rings, said connecting assembly including a wheel disk extending between the inner and outer rings and a rib assembly disposed on both sides of the disk in circumferential spaced-apart relationship;

a sealed rolling-contact bearing for supporting the track roller on the carrier via a fastening screw;

a first sealing element connected to the track roller on a carrier-distal side, wherein the first sealing element is configured in the form of a cap cover having an axially inwardly directed rim portion formed with a locking element for securement to the inner ring, and a bottom portion;

a second sealing element in the form of a cap cover disposed between the carrier and the track roller and detachably secured to the inner ring of the track roller, said second sealing element having an inwardly turned rim portion, which is formed with a locking element for attachment to the inner ring of the track roller, and a bottom portion formed with a central receiving bore for encompassing the carrier, and a seal extending axially inwardly from the bottom portion of the first sealing element at a marginal area thereof and made of elastic material, said seal having a sealing lip resting against an adaptation surface of the inner ring.

9. The pulley of claim 8, wherein the rib assembly has an axial extension which decreases in a direction of the inner ring.

10. The pulley of claim 8, wherein the rolling-contact bearing includes an inner bearing race having an inner surface area received by the carrier and the fastening screw.

11. The pulley of claim 8, wherein the rolling-contact bearing includes an inner bearing race held in place between a shoulder of the carrier and a head portion of the fastening screw.

12. The pulley of claim 8, wherein the rolling-contact bearing includes an outer bearing race having an outer surface area formed with a recess.

13. The pulley of claim 8, wherein the rolling-contact bearing is configured in the form of a cage-guided grooved ball bearing.

14. A tensioning or deflection pulley for a belt drive, comprising:

a carrier having a hub and a carrier portion extending radially outwardly from the hub and ending in an axially inwardly directed flange;

a track roller including an inner ring, an outer ring, and a connecting assembly for interconnecting the inner and outer rings, said connecting assembly including a wheel disk extending between the inner and outer rings and a rib assembly disposed on both sides of the disk in circumferential spaced-apart relationship;

a sealed rolling-contact bearing for supporting the track roller on the carrier via a fastening screw;

a first sealing element connected to the track roller on a carrier-distal side; and a second sealing element in the form of a cap cover disposed between the carrier and the track roller and detachably secured to the inner ring of the track roller, said second sealing element having an inwardly turned rim portion, which is formed with a locking element for attachment to the inner ring of the track roller, and a bottom portion formed with a central receiving bore for encompassing the carrier, wherein a gap is defined between the radially outwardly directed portion of the carrier and the bottom portion of the second sealing element, and between the axially inwardly directed flange of the carrier and the rim portion of the second sealing element.

15. The pulley of claim 14, wherein the carrier is spaced at a slight distance to the second sealing element to define a gap therebetween.

16. The pulley of claim 14, wherein the rib assembly has an axial extension which decreases in a direction of the inner ring.

17. The pulley of claim 14, wherein the rolling-contact bearing includes an inner bearing race having an inner surface area received by the carrier and the fastening screw.

18. The pulley of claim 14, wherein the rolling-contact bearing includes an inner bearing race held in place between a shoulder of the carrier and a head portion of the fastening screw.

19. The pulley of claim 14, wherein the rolling-contact bearing includes an outer bearing race having an outer surface area formed with a recess.

20. The pulley of claim 14, wherein the rolling-contact bearing is configured in the form of a cage-guided grooved ball bearing.

* * * * *